(12) United States Patent
Shinde et al.

(10) Patent No.: US 10,012,084 B2
(45) Date of Patent: Jul. 3, 2018

(54) GAS TURBINE ROTOR SEALING BAND ARRANGEMENT HAVING A FRICTION WELDED PIN ELEMENT

(71) Applicant: SIEMENS ENERGY, INC., Orlando, FL (US)

(72) Inventors: Sachin R. Shinde, Oviedo, FL (US); Phillip W. Gravett, Orlando, FL (US); Santosh Narasimhachary, Orlando, FL (US); Christopher W. Ross, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 38 days.

(21) Appl. No.: 14/480,706

(22) Filed: Sep. 9, 2014

(65) Prior Publication Data

US 2016/0069202 A1     Mar. 10, 2016

(51) Int. Cl.
| | |
|---|---|
| *F01D 5/06* | (2006.01) |
| *F01D 11/00* | (2006.01) |
| *B23K 20/12* | (2006.01) |
| *F02C 7/28* | (2006.01) |
| *F01D 5/08* | (2006.01) |

(52) U.S. Cl.
CPC .............. *F01D 5/06* (2013.01); *B23K 20/129* (2013.01); *F01D 5/066* (2013.01); *F01D 5/084* (2013.01); *F01D 11/005* (2013.01); *F02C 7/28* (2013.01); *F05D 2220/32* (2013.01); *F05D 2230/60* (2013.01); *F05D 2240/55* (2013.01)

(58) Field of Classification Search
CPC ........ F01D 11/005; F01D 11/008; F02C 7/28; F05D 2240/55
See application file for complete search history.

(56) References Cited

U.S. PATENT DOCUMENTS

| | | | | |
|---|---|---|---|---|
| 5,865,600 | A * | 2/1999 | Mori et al. | ................ 416/198 A |
| 5,967,746 | A * | 10/1999 | Hagi et al. | ................. 415/174.4 |
| 6,769,595 | B2 * | 8/2004 | Stol et al. | .................. 228/112.1 |
| 7,316,402 | B2 * | 1/2008 | Paauwe | ......................... 277/641 |
| 7,549,845 | B2 * | 6/2009 | Uwami et al. | ............ 416/198 A |
| 7,581,931 | B2 * | 9/2009 | Shaefer et al. | ........... 416/198 A |
| 8,570,505 | B2 * | 10/2013 | Baleine et al. | ............ 356/237.1 |
| 8,956,120 | B2 * | 2/2015 | Giametta | .................. 416/198 A |
| 9,200,519 | B2 * | 12/2015 | Nereim et al. | |
| 2006/0239814 | A1 * | 10/2006 | Uwami et al. | ................ 415/134 |
| 2009/0148279 | A1 * | 6/2009 | Shaefer et al. | ............ 415/173.5 |
| 2009/0191050 | A1 * | 7/2009 | Nereim et al. | ............. 415/173.7 |
| 2013/0064645 | A1 * | 3/2013 | Giametta | ........................ 415/68 |
| 2013/0106066 | A1 * | 5/2013 | Sarawate et al. | ............. 277/641 |

(Continued)

*Primary Examiner* — Nicholas L Foster (57) ABSTRACT

A sealing band arrangement for a gas turbine including first and second adjoining rotor disks separated by a gap wherein the first rotor disk includes an aperture. The sealing band arrangement includes at least one seal strip segment located within the gap, wherein the seal strip segment includes a first mating surface. The sealing band arrangement further includes a block having a locking section located within the aperture to stop circumferential movement of the seal strip segment relative to the first and second disks. A tapered pin element extends through the seal strip segment and the block. The tapered pin element is friction welded to both the seal strip segment and the block to attach the block to the first mating surface of the seal strip segment.

15 Claims, 5 Drawing Sheets

(56) References Cited

U.S. PATENT DOCUMENTS

| | | | |
|---|---|---|---|
| 2013/0235391 A1* | 9/2013 | Baleine et al. | 356/625 |
| 2014/0112766 A1* | 4/2014 | Nereim et al. | 415/173.7 |
| 2014/0119899 A1* | 5/2014 | Nereim et al. | 415/173.1 |
| 2014/0119900 A1* | 5/2014 | Gurao et al. | 415/173.1 |
| 2014/0255169 A1* | 9/2014 | Muller et al. | 415/173.7 |
| 2015/0198055 A1* | 7/2015 | Mitchell et al. | 415/110 |
| 2016/0010478 A1* | 1/2016 | Gurao | 277/312 |

* cited by examiner

GAS TURBINE ROTOR SEALING BAND ARRANGEMENT HAVING A FRICTION WELDED PIN ELEMENT

CROSS REFERENCE TO RELATED APPLICATION

The entire disclosure of U.S. patent application Ser. No. 13/665,992, filed on Nov. 1, 2012, and entitled GAS TURBINE INCLUDING BELLY BAND SEAL ANTI-ROTATION DEVICE is hereby incorporated by reference in its entirety.

FIELD OF THE INVENTION

The invention relates to rotor sealing bands used in gas turbines, and more particularly, to a rotor sealing band arrangement that includes a tapered pin element that extends through a seal strip segment and a block wherein the tapered pin element is friction welded to both the seal strip segment and the block to attach the block to the seal strip segment.

BACKGROUND OF THE INVENTION

Figure 1:
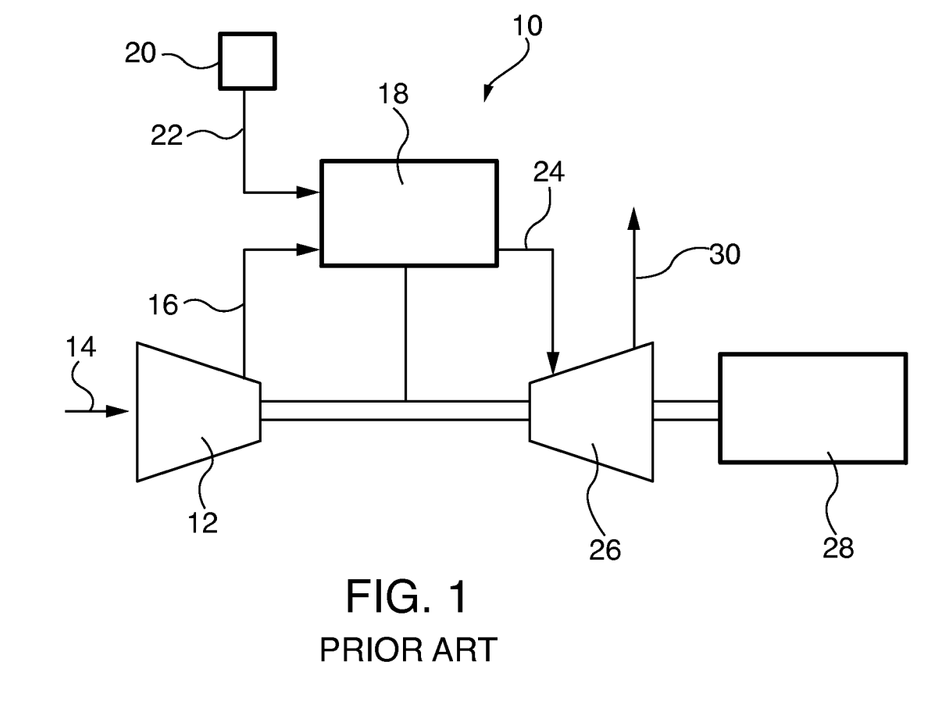
FIG. 1 is a schematic representation of a gas turbine.

In various multistage turbomachines used for energy conversion, such as gas turbines, a fluid is used to produce rotational motion. Referring to FIG. 1, a gas turbine 10 is schematically shown. The turbine 10 includes a compressor 12, which draws in ambient air 14 and delivers compressed air 16 to a combustor 18. A fuel supply 20 delivers fuel 22 to the combustor 18 where it is combined with the compressed air 16 and the fuel 22 is burned to produce high temperature combustion gas 24. The combustion gas 24 is expanded through a turbine section 26, which includes a series of rows of stationary vanes and rotor blades. The combustion gas 24 causes the rotor blades to rotate to produce shaft power for driving the compressor 12 and a load, such as an electrical generator 28. Expanded gas 30 is either exhausted to the atmosphere directly, or in a combined cycle plant, may be exhausted to atmosphere through a heat recovery steam generator.

The rotor blades are mounted to disks that are supported for rotation on a rotor shaft. Annular arms extend from opposed surfaces of adjoining disks to form pairs of annular arms each separated by a gap. A cooling air cavity is formed on an inner side of the annular arm pairs between the disks of mutually adjacent stages. In addition, a labyrinth seal may be provided on an inner circumferential surface of stationary vane structures that cooperate with the annular arms to form a gas seal between a path for the hot combustion gases and the cooling air cavity. Each annular arm includes a slot for receiving a seal strip, known as a "belly band", which spans the gap between each annular arm pair to stop a flow of cooling air from the cooling air cavity into a path for the combustion gas 24. The seal strip may include multiple segments that extend in a circumferential direction and are interconnected at lapped or stepped ends.

During use, the seal strips may shift in a circumferential direction relative to each other. Shifting may cause one end of a segment to increase an overlap with an adjacent segment, while an opposite end of the segment will move out of engagement with an adjacent segment thus opening a gap for passage of gases through the seal strip. Therefore, an anti-rotation mechanism is provided for stopping circumferential shifting of seal strip segments. An anti-rotation mechanism that is originally installed at the factory during assembly of a gas turbine exhibits wear after an extended period of operation. This necessitates field replacement of the anti-rotation mechanism with a configuration that is adapted for being installed in the field such as a T-shaped block that is attached to the seal strip by a welding process known as a tungsten inert gas (TIG) welding process. However, stress relieving of the weld, such as by heat treatment, is difficult to perform in the field due to the configuration of the turbine rotor. As such, residual stresses from the welding process result in the formation of cracks in the seal strip and surrounding areas after an extended period of turbine operation. Further, arc strikes may occur on the rotor disk during the welding process which undesirably hardens the disk material causing an increased risk of crack formation and propagation.

SUMMARY OF INVENTION

A sealing band arrangement is disclosed for a gas turbine including first and second adjoining rotor disks separated by a gap wherein the first rotor disk includes an aperture. The sealing band arrangement includes at least one seal strip segment located within the gap, wherein the seal strip segment includes a first mating surface. The sealing band arrangement further includes a block having a locking section located within the aperture to stop circumferential movement of the seal strip segment relative to the first and second disks. A tapered pin element extends through the seal strip segment and the block. The tapered pin element is friction welded to both the seal strip segment and the block to attach the block to the first mating surface of the seal strip segment. The sealing band arrangement inhibits or prevents leakage of cooling air into a hot gas path of the gas turbine.

Those skilled in the art may apply the respective features of the present invention jointly or severally in any combination or sub-combination.

BRIEF DESCRIPTION OF DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
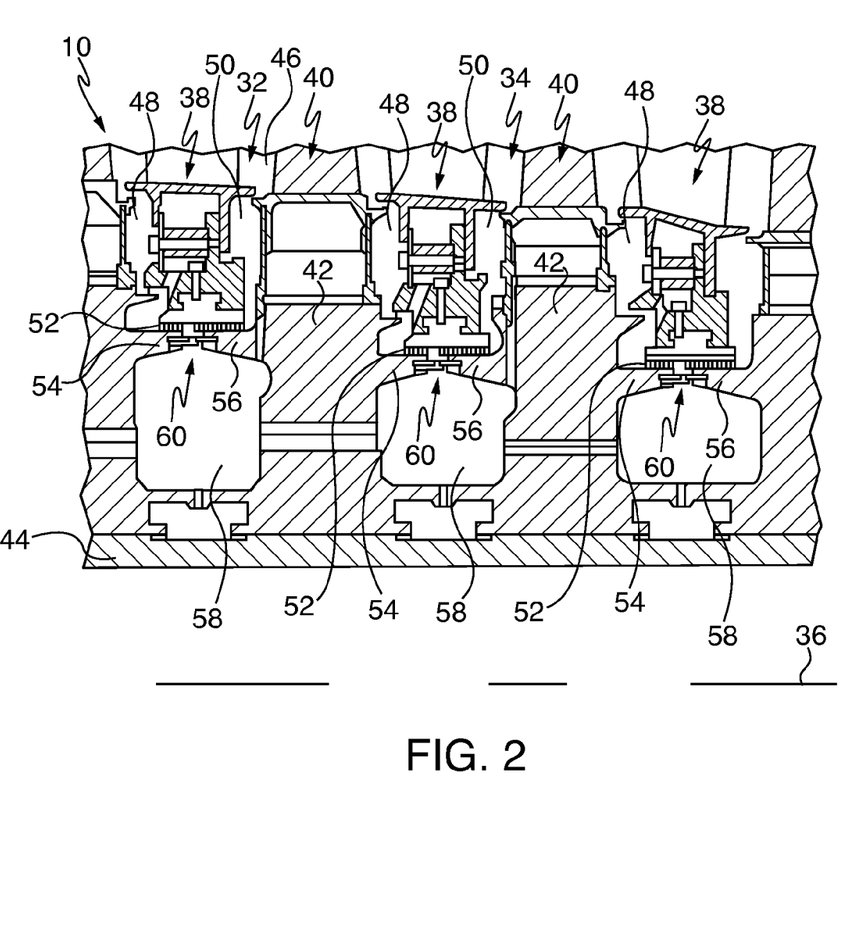
FIG. 2 is a partial cross sectional view of gas turbine.

Referring to FIG. 2, a partial cross sectional view of gas turbine 10 is shown. The gas turbine 10 includes adjacent stages 32, 34 oriented about an axis 36. Each of the stages 32, 34 includes a plurality of stationary vane assemblies 38 and a plurality of rotating blades 40. The vane assemblies 38 and blades 40 are positioned circumferentially within the gas turbine 10 with alternating arrays of vane assemblies 38 and blades 40 extending in an axial direction of the gas turbine 10. The blades 40 are supported on rotor disks 42 secured to adjacent disks with spindle bolts 44. The vane assemblies 38 and blades 40 extend into an annular gas passage 46. Hot gases directed through the gas passage 46 flow past the vane assemblies 38 and blades 40.

Disk cavities 48, 50 are located radially inward from the gas passage 46. Purge air is provided from cooling gas passing through internal passages in the vane assemblies 38 to the disk cavities 48, 50 to cool the disc cavity environment and to provide a pressure to balance against the pressure of the hot gases in the gas passage 46. In addition, interstage seals including labyrinth seals 52 are supported at a radially inner side of the vane assemblies 38 and are engaged with surfaces defined on paired annular disk arms 54, 56 that extend axially from opposed surfaces of adjoining disks 42.

An annular cooling air cavity 58 is formed between the opposed surfaces of adjoining disks 42 on a radially inner side of the paired annular disk arms 54, 56. The annular cooling air cavity 58 receives cooling air passing through disk passages to cool the disks 42 and turbine blades 40. A sealing band 60 or "belly band" seal is positioned between the annular cooling air cavity 58 and the disk cavities 48, 50. The sealing band 60 prevents or substantially limits the flow of gases between the cooling air cavity 58 and the disk cavities 48, 50.

Figure 3:
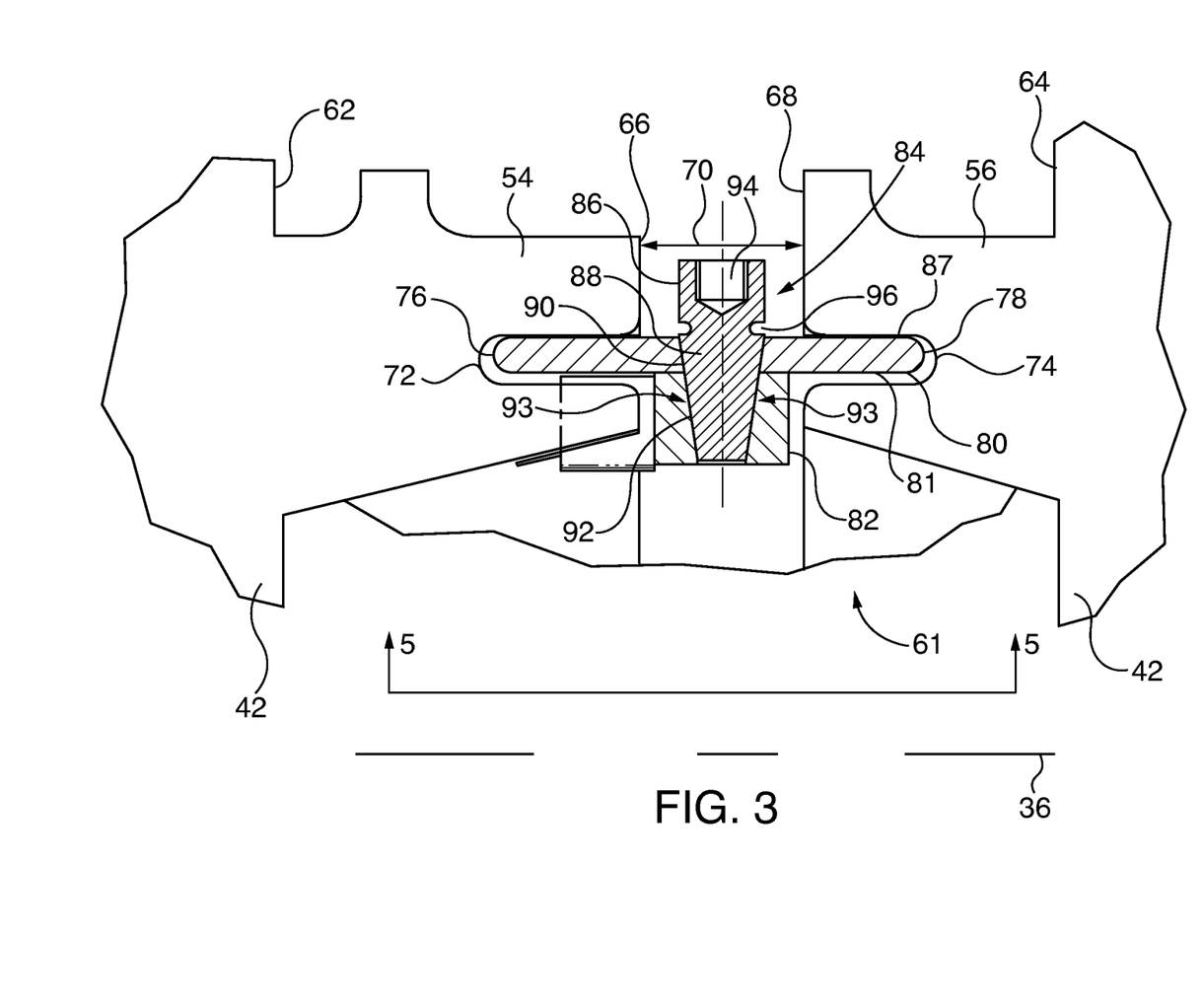
FIG. 3 depicts exemplary annular disk arms of adjoining exemplary disks and a sealing band arrangement in accordance with the present invention.

Referring to FIG. 3, exemplary annular disk arms 54, 56 of adjoining exemplary disks 42 and a sealing band arrangement 61 of the sealing band 60 are shown. The disks 42 and associated disk arms 54, 56 define an annular structure extending the full circumference about a rotor centerline. The disk arms 54, 56 extend from opposed surfaces 62, 64 respectively, of the disks 42. The disk arms 54, 56 include opposed end faces 66, 68, respectively, which are separated by an annular gap 70. A circumferentially extending slot 72, 74 is formed in the respective end faces 66, 68, wherein the slots 72, 74 are radially aligned with gap 70. The sealing band arrangement 61 includes a seal strip segment 80 having sealing band end portions 76, 78. The end portions 76, 78 are positioned within the respective slots 72, 74 such that the seal strip segment 80 spans the gap 70 between the end faces 66, 68.

Figure 4:
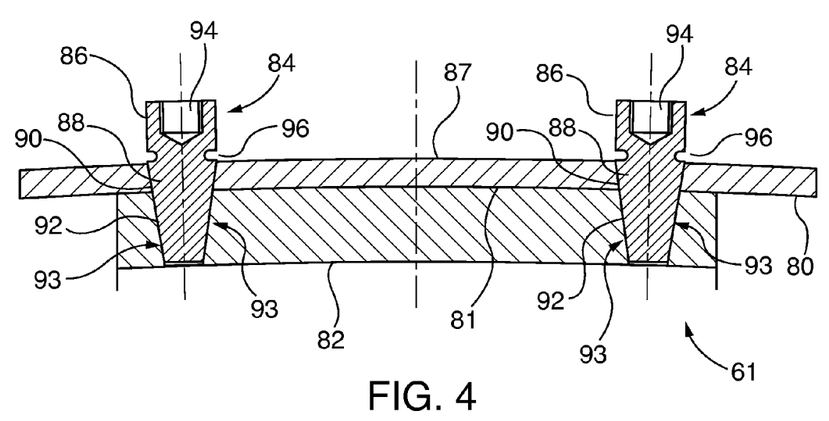
FIG. 4 is a cross-sectional side view of the sealing band arrangement.

The sealing band arrangement 61 includes a substantially T-shaped block 82 as will be described and a pin element 84 having a pin head 86 and a tapered shaft 88. The block 82 mates with a radially inner surface 81 of the seal strip 80. The pin element 84 is oriented such that a width of the shaft 88 tapers as the shaft 88 extends toward the axis 36. Referring to FIG. 4, a cross-sectional side view of the sealing band arrangement 61 is shown. The seal strip segment 80 has a curvature that is substantially equivalent to a curvature of the disk arms 54, 56. In the embodiment shown in FIG. 4, two pin elements 84 are shown although it is understood that additional pin elements 84 or a single pin element 84 may be used. Referring back to FIG. 3, the seal strip segment 80 and the block 82 include tapered holes 90, 92, respectively, whose taper corresponds to the taper of the shaft 88. The pin element 84 is assembled by first positioning the shaft 88 above the seal strip segment 80. The shaft 88 is then inserted through the hole 90 in the seal strip segment 80 and subsequently through the hole 92 in the block 82. The shaft 88 is then attached to both the seal strip segment 80 and the block 82 by a welding process, for example, thereby attaching the block 82 to the seal strip segment 80. In an embodiment, a friction welding process is used to attach the shaft 88 to both the seal strip segment 80 and block 82. Friction welding is a welding process wherein heat is generated through mechanical friction between a moving component and a stationary component under a compressive force to plastically displace and fuse the components.

The pin head 86 includes a recess 94 for receiving a tool from a friction welding device. The tool causes the pin element 84 to rotate at a sufficiently high rate of speed relative to the seal strip segment 80 and the block 82 and to provide a compressive force sufficient to form a friction weld joint 93 between the shaft 88 and both the seal strip segment 80 and the block 82. After the weld joint 93 is formed, a portion of the pin head 86 that extends beyond a radial outer surface 87 of the seal strip segment 80 is removed. In particular, the pin element 84 may include an undercut 96 to facilitate removal of the pin head 86. It is understood that the shaft 88 may have other shapes, such as a cylindrical shape for example, that are suitable for forming the weld joint 93. Further, the pin element 84 may be positioned in other orientations relative to the axis 36.

Figure 5:
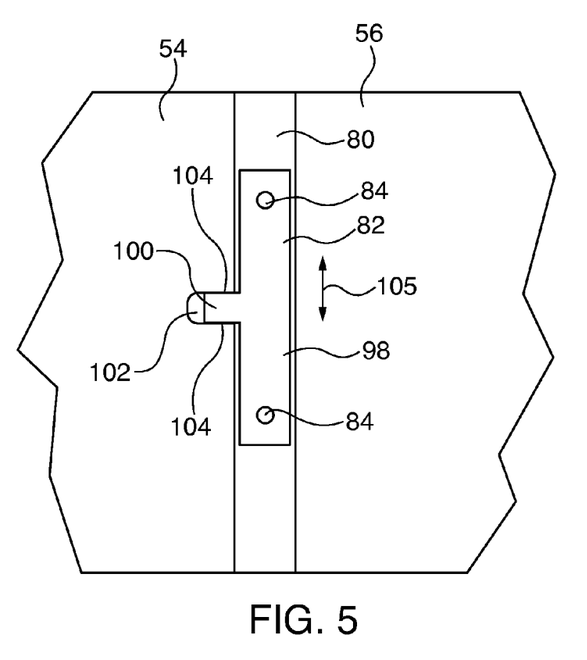
FIG. 5 is a bottom view of a T-block along view line 5-5 of FIG. 3.

Referring to FIG. 5, a bottom view of the block 82 along view line 5-5 of FIG. 3 is shown. The block 82 includes an attachment section 98 oriented in a circumferential direction along the seal strip segment 80 and a locking section 100 that extends in a direction transverse to the attachment section 98 to form a substantially T-shaped block 82. The attachment section 98 and the locking section 100 may be integrally or unistructurally formed to form a one-piece configuration. The locking section 100 is located in a notch or aperture 102 formed in disk arm 54. In an embodiment, the locking section 100 and aperture 102 each have a rectangular shape, although it is understood that other shapes may be used such as a cone shape or other shapes that engage each other. Alternatively, the aperture 102 may be formed in disk arm 56. Contact between sidewalls 104 of the aperture 102 and the locking section 100 serves to constrain circumferential movement 105 of the block 82 and thus the seal strip segment relative to the disk arm 54. Thus, the block 82 serves as an anti-rotation device for inhibiting or stopping circumferential movement 105 or shifting of an associated seal strip segment 80. In an embodiment, the block 82 is located in a circumferential center portion of the seal strip segment 80 between ends of the seal strip segment 80. In accordance with the invention, a gas turbine may include a plurality of seal strip segments 80 each including the block 82 to inhibit or stop circumferential movement 105 of an associated seal strip segment 80. The seal strip segments 80 form a continuous sealing band 60 for preventing or substantially limiting the flow of gases between the cooling air cavity 58 and the disk cavities 48, 50. In an embodiment, four seal strip segments 80 are used.

Alternatively, the aperture 102 may be pre-existing, i.e. previously provided for engagement with an anti-rotation mechanism originally installed at the factory during assembly of a gas turbine. Thus, the present invention does not require modification of the arms 54 or 56. Further, the present invention enables field replacement of an existing anti-rotation mechanism and belly band seal.

Figure 6:
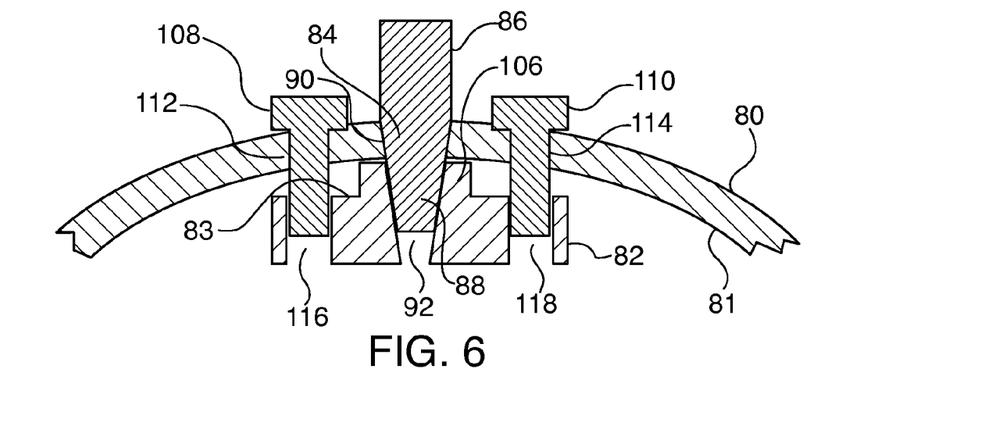
FIG. 6 shows an alternate embodiment for the block in a cross-sectional side view.
Figure 7:
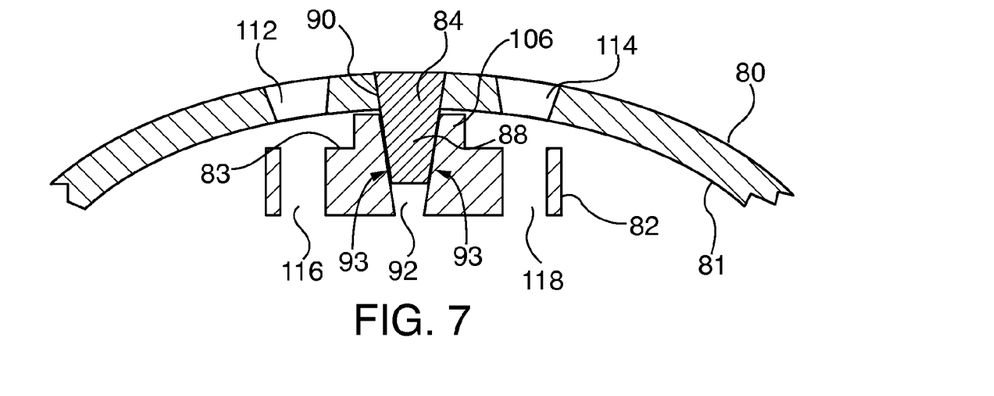
FIG. 7 shows the block of the alternate embodiment after being friction welded to a seal strip segment and with fasteners removed.
Figure 8:
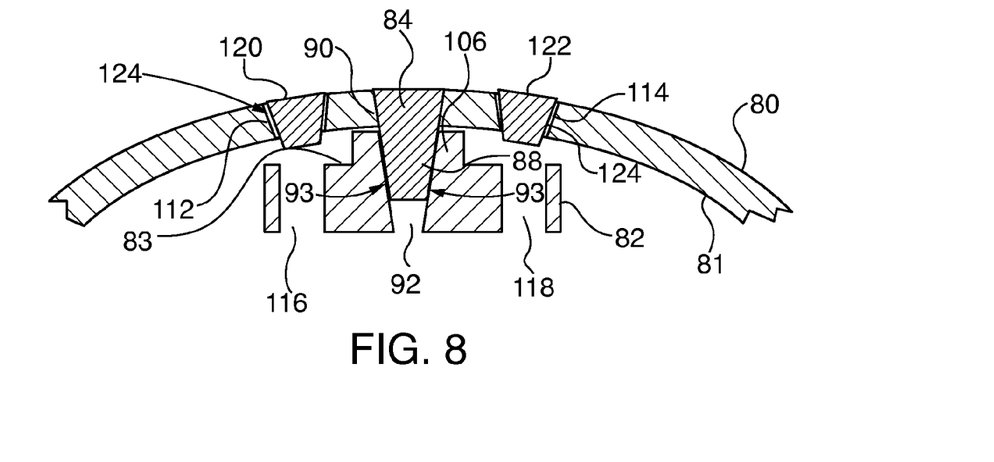
FIG. 8 shows the block of the alternate embodiment after shortened pin elements are friction welded in holes.

Referring to FIG. 6, an alternate embodiment for the block 82 is shown in a cross-sectional side view. In this embodiment, a single pin element 84 is used to attach the block 82 to the seal strip segment 80. The block 82 includes a raised portion 106 that extends above a radially outer surface 83 of the block 82. This reduces a contact area between the block 82 and the seal strip segment 80 thereby providing additional flexibility for the seal strip segment 80. In order to attach the block 82 to the seal strip segment 80, threaded fasteners 108, 110 are first inserted through holes 112, 114, respectively, formed in seal strip 80. The fasteners 108, 110 are then threadably engaged with threaded holes 116, 118, respectively, formed in the block 82. The pin element 84 is then friction welded to the seal strip segment 80 and the block 82 as previously described to form the weld joint 93 and thereby attach the block 82 to the seal strip segment 80. After the weld joint 93 is formed, the fasteners 108, 110 are removed. Therefore, the fasteners 108, 110 are only temporarily used to attach the block 82 to the seal strip segment 80 while friction welding is performed. Further, the pin head 86 is also removed as previously described. Upon removal of the fasteners 108, 110, the holes 112, 114 are open as shown in FIG. 7 thus forming undesirable leakage paths in the seal strip segment 80. In accordance with the invention, shortened pin elements 120, 122 are then friction welded into the respective holes 112, 114 thus forming a weld joint 124 and sealing the seal strip segment 80 as shown in FIG. 8.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sealing band arrangement for a gas turbine, comprising:
   first and second adjoining rotor disks separated by a gap, wherein the first rotor disk includes a cutout portion defined by aperture walls that extend into the first rotor disk to form an aperture within the first rotor disk;
   at least one seal strip segment located within the gap, wherein the seal strip segment has a mating surface having an axial width;
   a block having an attachment section oriented in a circumferential direction and a locking section oriented in a direction transverse to the attachment section,
   wherein the attachment section is located between the first and second rotor disks and does not extend into either the first or second rotor disk,
   wherein the attachment section has a mating surface having an axial width,
   wherein the axial width of the mating surface of the attachment section is smaller than the axial width of the mating surface of the seal strip segment,
   wherein the attachment section constitutes an entire area of contact between the seal strip segment and the block,
   wherein the locking section extends into the aperture formed within the first rotor disk and,
   wherein contact between the locking section and the aperture walls stops circumferential movement of the seal strip segment relative to the first and second disks;
   a pin element that extends through the seal strip segment and the attachment section, the pin element including a recess configured to receive a tool from a friction welding device to impart rotation to the pin element; and
   a friction weld joint formed in response to the rotation imparted to the pin element, the friction weld joint formed between the pin element and both the seal strip segment and the attachment section to attach the mating surface of the attachment section to the mating surface of the seal strip segment.

2. The sealing band arrangement according to claim 1, wherein the pin element is tapered.

3. The sealing band arrangement according to claim 1, wherein the locking section has a rectangular shape.

4. The sealing band arrangement according to claim 1, wherein the pin element is located in a center portion of the seal strip segment.

5. The sealing band arrangement according to claim 1, wherein the sealing band arrangement includes four seal strip segments.

6. The sealing band arrangement according to claim 1, wherein the pin element includes a removable head.

7. A sealing band arrangement for a gas turbine, comprising:
   first and second adjoining rotor disks separated by a gap, wherein the first rotor disk includes a cutout portion defined by aperture walls that extend into the first rotor disk to form an aperture within the first rotor disk;
   at least one seal strip segment located within the gap, wherein the seal strip segment has a mating surface having an axial width;
   a block having an attachment section oriented in a circumferential direction and a locking section oriented in a direction transverse to the attachment section,
   wherein the attachment section is located between the first and second rotor disks and does not extend into either the first or second rotor disk,
   wherein the attachment section has a mating surface having an axial width,
   wherein the axial width of the mating surface of the attachment section is smaller than the axial width of the mating surface of the seal strip segment
   wherein the attachment section constitutes an entire area of contact between the seal strip segment and the block,
   wherein the locking section extends into the aperture formed within the first rotor disk,
   wherein contact between the locking section and one of the aperture walls stops circumferential movement of the seal strip segment relative to the first and second disks, and
   wherein the block includes a raised portion that includes the mating surface of the attachment section;
   a pin element that extends through the seal strip segment and the attachment section, the pin element including a recess configured to receive a tool from a friction welding device to impart rotation to the pin element; and a friction weld joint formed in response to the rotation imparted to the pin element, the friction weld joint formed between the pin element and both the seal strip segment and the attachment section to attach the mating surface of the raised portion of the block to the mating surface of the seal strip segment.

8. The sealing band arrangement according to claim 7, wherein the pin element is tapered.

9. The sealing band arrangement according to claim 7, wherein the locking section has a rectangular shape.

10. The sealing band arrangement according to claim 7, wherein the pin element is located in a center portion of the seal strip segment.

11. The sealing band arrangement according to claim 7, wherein the sealing band arrangement includes four seal strip segments.

12. The sealing band arrangement according to claim 7, wherein the pin element includes a removable head.

13. The sealing band arrangement according to claim 7, further including at least one additional pin element for closing holes formed in the seal strip segment.

14. The sealing band arrangement according to claim 7, wherein the raised portion of the block and the mating surface of the seal strip segment are attached by removable fasteners before the weld joint is formed between the pin element and both the seal strip segment and the attachment section.

15. The sealing band arrangement according to claim 7, wherein the aperture and the locking section have substantially similar shapes.

* * * * *